April 10, 1934.  H. A. SORUM  1,954,300

TIRE SPREADER

Filed Aug. 22, 1933  5 Sheets-Sheet 1

Inventor

H. A. Sorum

By Clarence A. O'Brien
Attorney

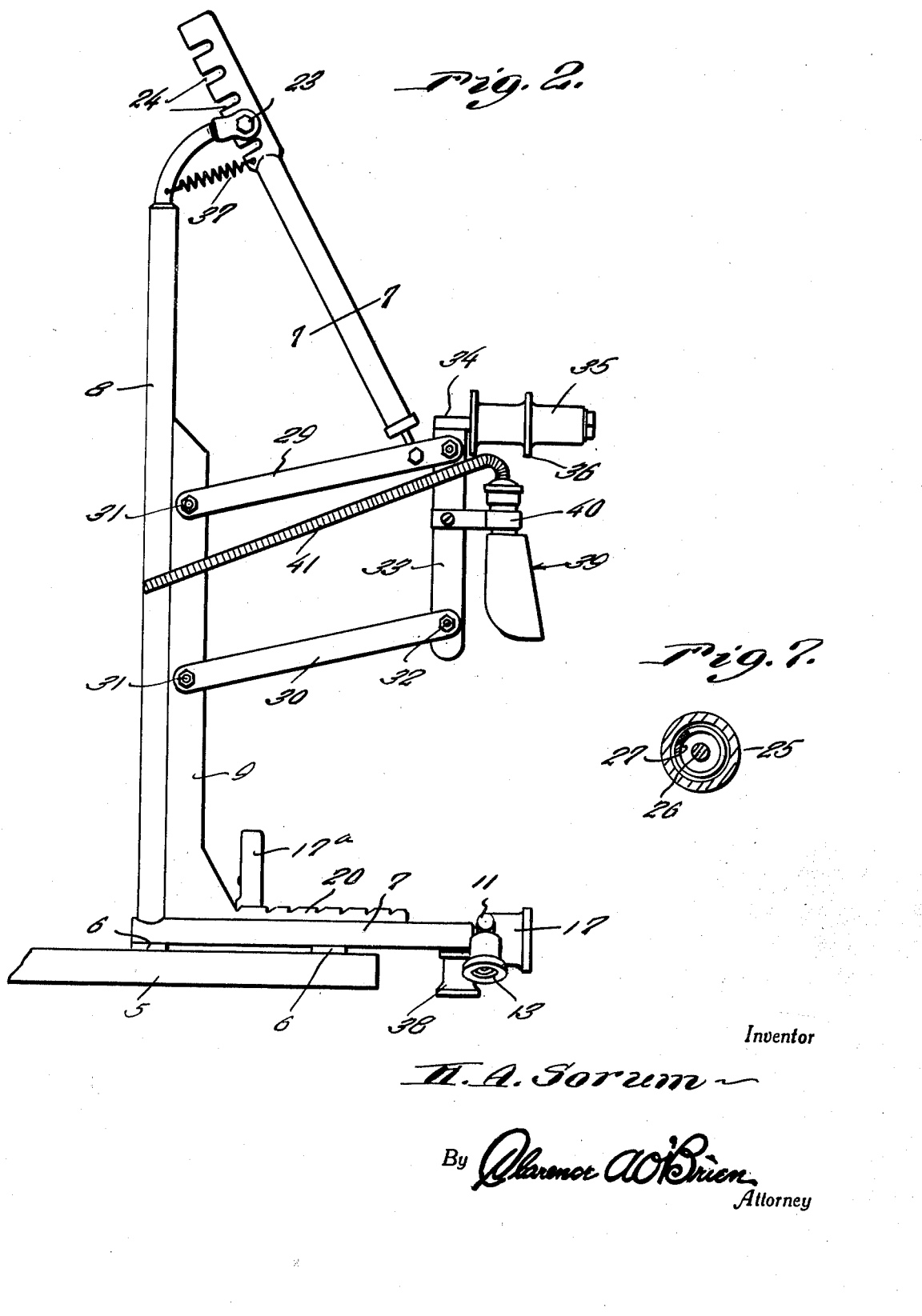

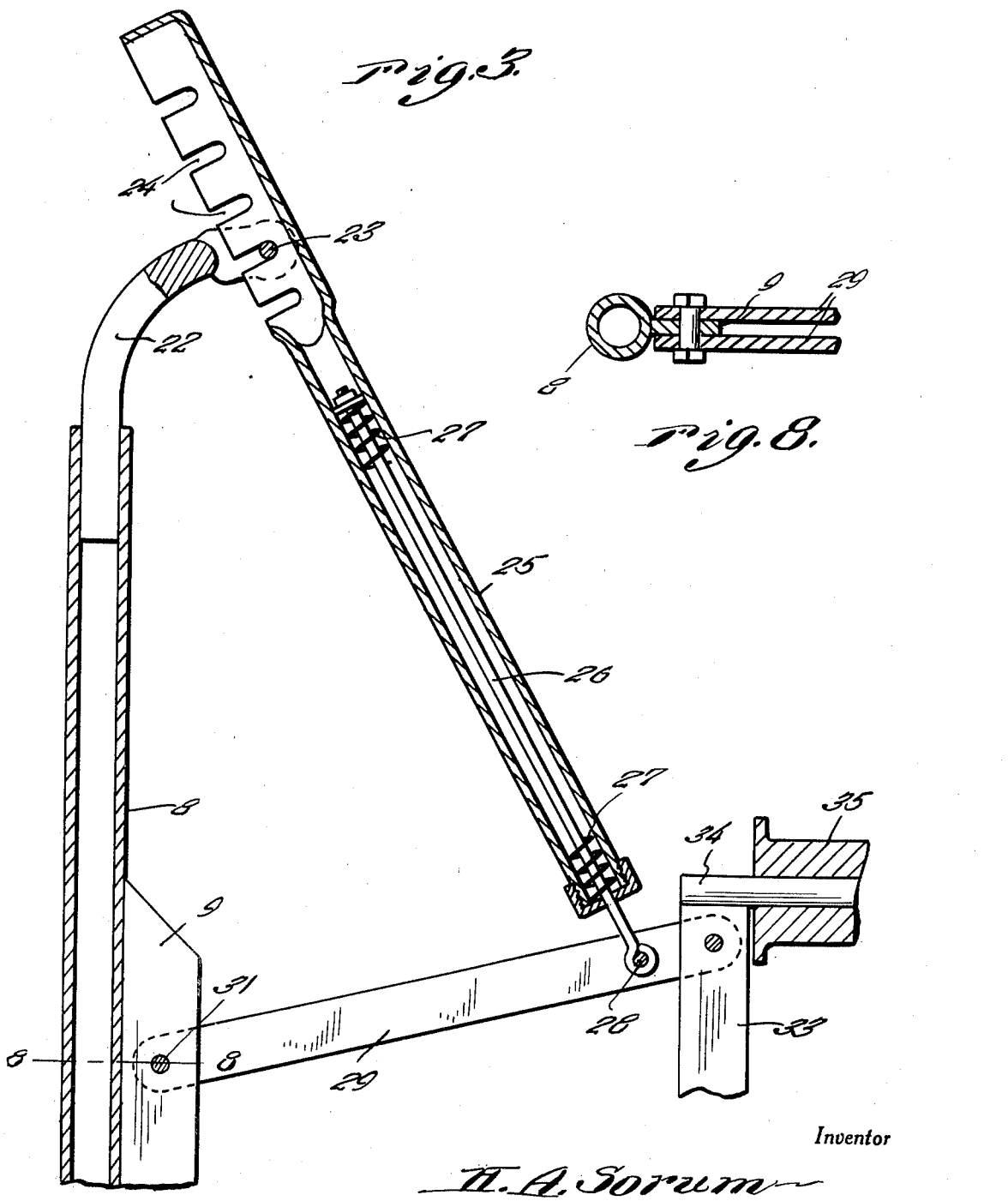

April 10, 1934.  H. A. SORUM  1,954,300
TIRE SPREADER
Filed Aug. 22, 1933   5 Sheets-Sheet 4
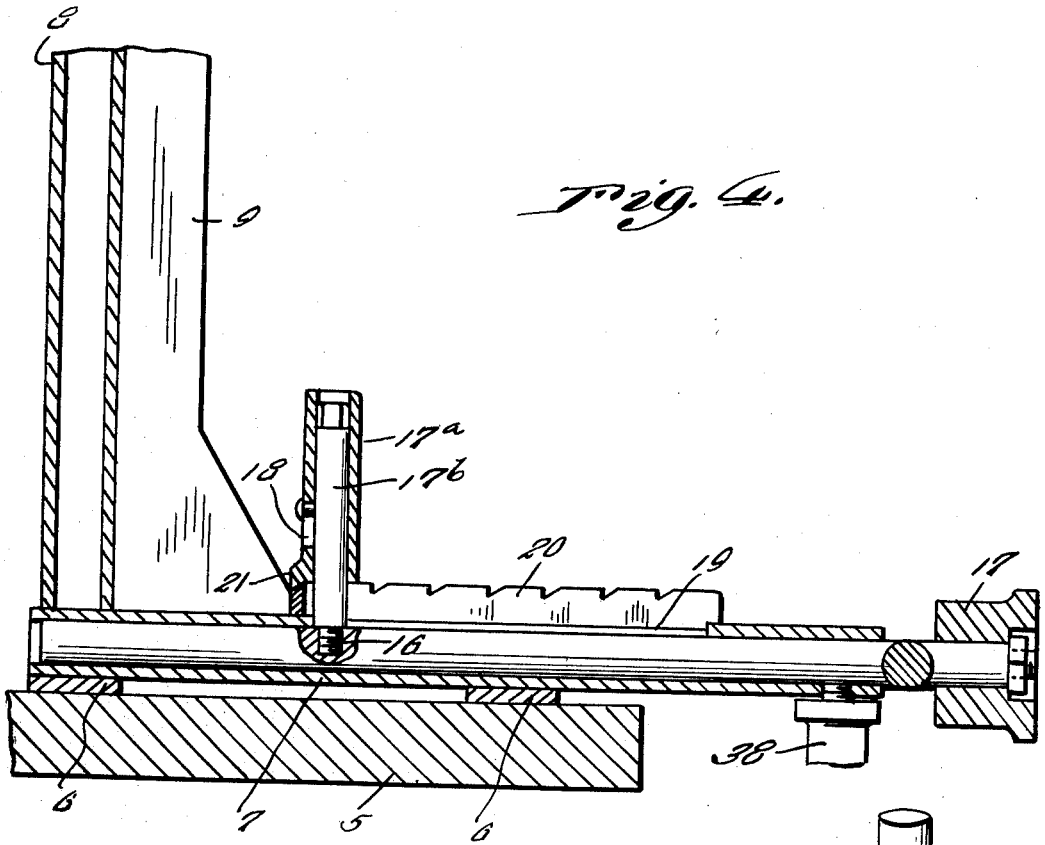
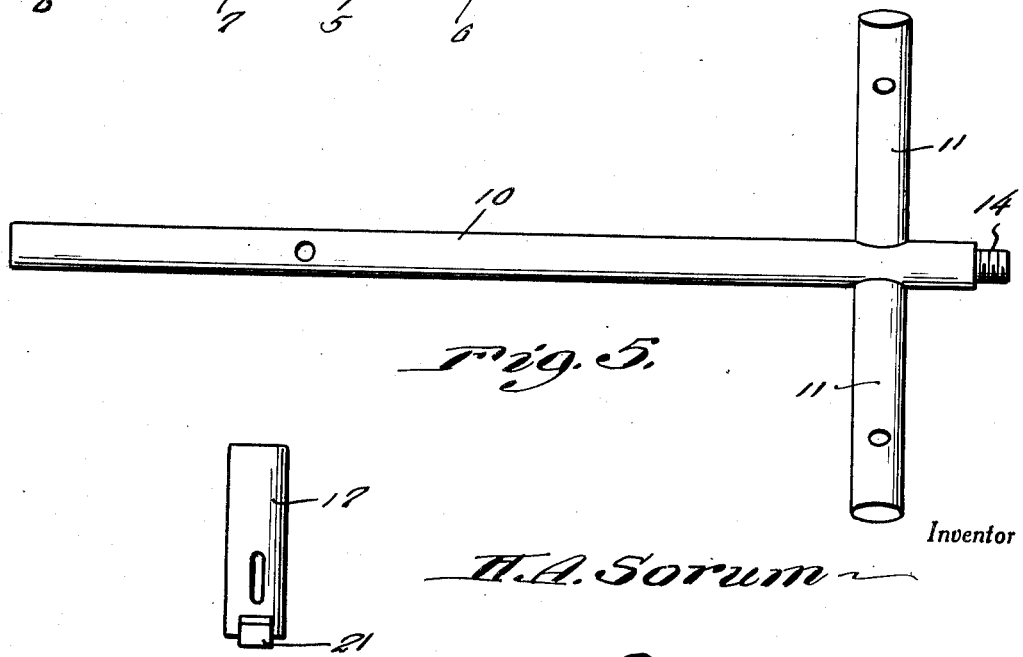
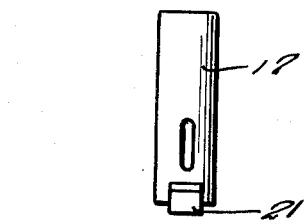
Inventor
H. A. Sorum
By Clarence A. O'Brien
Attorney April 10, 1934.   H. A. SORUM   1,954,300
TIRE SPREADER
Filed Aug. 22, 1933    5 Sheets-Sheet 5
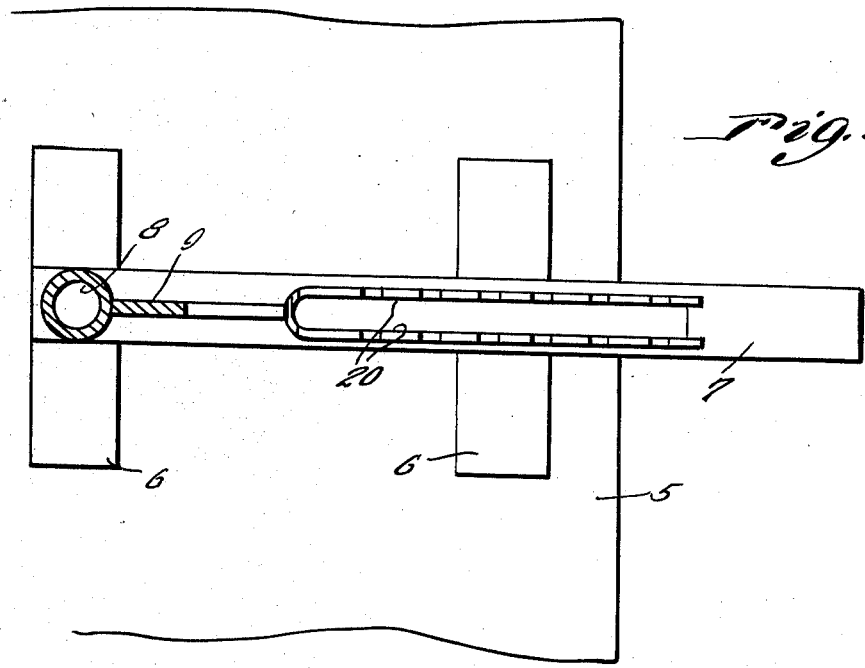
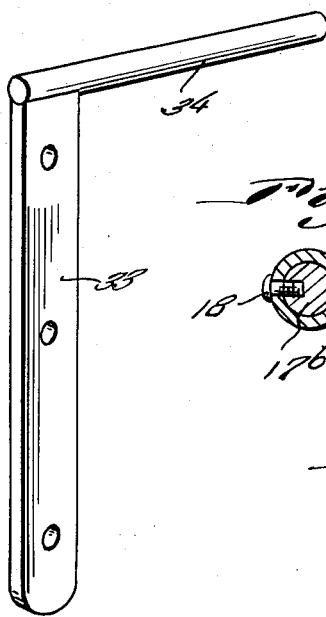
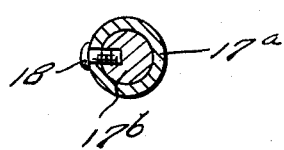
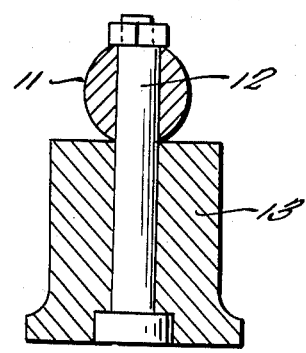
Inventor
H. A. Sorum
By Clarence A. O'Brien
Attorney Patented Apr. 10, 1934

1,954,300

UNITED STATES PATENT OFFICE 1,954,300

TIRE SPREADER

Herbert A. Sorum, Shelby, Mont.

Application August 22, 1933, Serial No. 686,299

5 Claims. (Cl. 154—9)

This invention relates to tire spreaders and has as its object the provision of a device of this character which is simple and economical in construction and provides for the spreading of the tire without injury to the tire casing and the invention together with its objects and advantages will be best understood from a study of the following description taken in connection with the accompanying drawings wherein is illustrated a preferred embodiment of the invention.

In the drawings:

Figure 2 is a side elevational view of the spreader.

Figure 3 is an enlarged view partly in section and partly in elevation of the upper portion of the spreader.

Figure 4 is a vertical sectional elevational view through a lower part of the spreader.

Figure 5 is a plan view of a roller supporting rod.

Figure 6 is an elevational view of a lug equipped section of a handle forming part of the invention.

Figure 7 is a sectional view taken substantially on the line 7—7 of Figure 2.

Figure 8 is a sectional view taken substantially on the line 8—8 of Figure 3.

Figure 9 is a horizontal sectional elevational view through the device.

Figure 10 is a perspective view of a perpendicular member to be hereinafter more fully referred to.

Figure 11 is a sectional view through a handle to be hereinafter more fully referred to.

Figure 12 is a sectional view showing the manner of securing one of the rollers to an arm of the rod shown in Figure 5.

Figure 1:
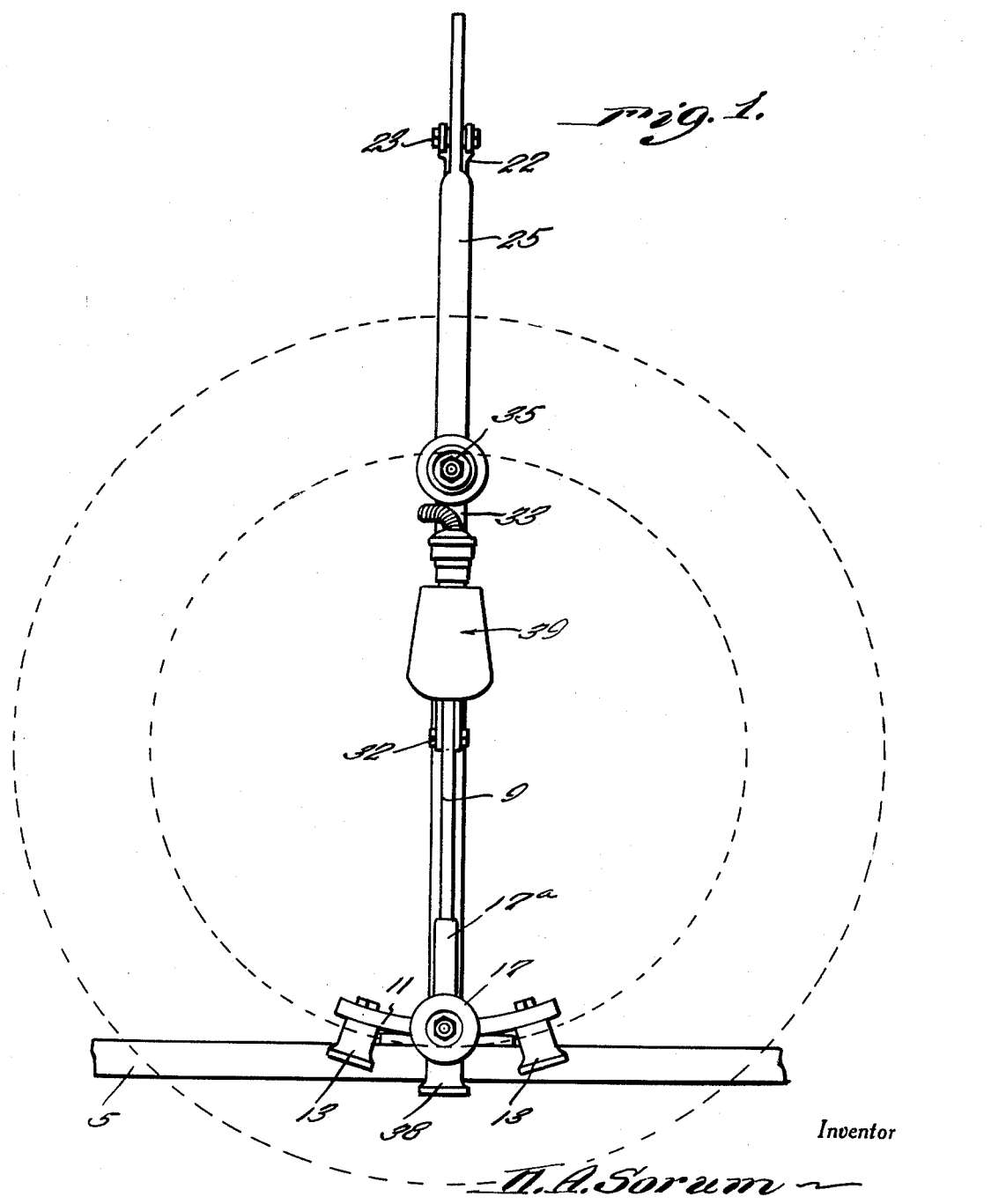
Figure 1 is a front elevational view illustrating the application of the invention.

Referring to the drawings by reference numerals it will be seen that 5 designates a base, the same being in the nature of the top of a work bench or the like. Mounted on the base 5 and spaced therefrom by spacer strips 6 is a substantially L-shaped structure comprising a horizontal tubular member 7 and a vertical tubular member 8. Integral with the members 7 and 8 is a vertical web or rib 9.

Slidably mounted in the tubular member 7 is a rod 10 which at its outer or free end is provided with upwardly curved oppositely extending arms 11. To the outer ends of the arms 11 are secured through the medium of bolts 12 rollers 13 as will be clear from a study of Figure 12. At said outer end the rod 10 also accommodates a horizontal roller 13 the same being provided at its outer end with a recess to accommodate the threaded nut equipped end 14 of the rod 10 as will be clear from a study of Figures 4 and 5.

To facilitate sliding of the rod 10 there is provided a handle which includes a fixed inner member 17b that at its lower end is provided with a threaded pin screw threaded into an opening provided in the top of the rod 10 at the end thereof remote from the arms 11 as indicated generally by the reference numeral 16. Also forming a part of said handle is an outer tubular member or sleeve 17a slidable on the inner member 17b and limited in its sliding movement longitudinally of the member 17b through the medium of suitable pin and slot means 18.

The handle operates in a slot 19 provided in the top of the member 7. Integral with the member 7 and extending along both sides of the slot 19 is a substantially U-shaped rack bar 20 with which cooperates a lug 21 provided on the lower end of the handle member 17a. As is obvious with lug 21 engaged with the rack bar 20 rod 10 will be secured at the desired adjustment. To shift the rod 10 the handle member 7 is pulled upwardly to release the lug 21 thus permitting the handle to be manipulated for sliding the rod 10 inwardly or outwardly with respect to the tubular member 7.

Telescoped within the upper end of the vertical tubular member 8 is a longitudinally curved arm 22 that has its inner end fixed or otherwise secured within the tubular member 8. On its outer end the arm 22 is provided with a head in the form of a yoke and supports a transverse pin 23 in engagement with the notches 24 provided in the upper or head end of a tubular rod 25.

Mounted for reciprocation within the rod 25 is a plunger rod 26 which is normally urged inwardly of the rod 25 through the medium of a suitable spring device 27. The outer end of the rod 26 is provided with an eye connected with a pin 28 secured between an upper pair of links 29. Links 29 together with a second and lower pair of links 30 are pivoted at one end as at 31 in vertically spaced relation on the web or rib 9 as clearly shown in Figure 2. At their outer or free ends the pairs of links 29, 30 are pivotally connected at 32 with a perpendicular bar or elongated plate 33. Plate 33 at its upper end has integral therewith a stub shaft 34 on which is revolubly mounted a roller 35 provided intermediate its ends with a flange 36. It is obvious the links 29, 30 are mounted for vertical swinging movement and are held at the desired adjustment by the engagement of selected notches 24 with the pin 23. The notches 24 are held in engagement with the pin 23 by means of a suitable spring 37 as shown in Figure 2.

It is thought an operation of the device will be apparent from the following:

Parts 29, 30, 33 are first placed at the desired adjustment and secured in said adjustment by engaging the proper slot 24 with the pin 23. The tire casing is then placed over the roller 35 with the flange 36 of the roller extending inwardly of the casing between the beads of the casing. The flange 36 thus located with respect to the beads or side walls of the casing will prevent the tire casing from running off the roller when the casing is turning. Next the casing is pulled downwardly, this being possible since the member 33 is capable of moving downwardly, links 29, 30 swinging downwardly about their pivots 31 against the action of the spring device 27, on the rod 26, the lower portion of the tire casing being engaged with the rollers 13 and 17, and also with a fixed roller 38 mounted as clearly shown in Figure 4 on the outer end of the tubular member 7. In engaging the tire casing with the rollers 13, 17 and 38, rollers 11 are placed within the casing between the side walls of the casing, with the fixed roller 38 also arranged within the casing in bearing contact with the inner face of the inside wall of the casing at the bead thereof, and with the rollers 17 engaging the periphery of the bead on the outside wall of the tire casing.

With the tire casing thus mounted on the device the operator raises the handle member 17a to release the lug 21 and then pulls the handle towards himself to slide the rod 10 outwardly with respect to the tube 7. This outward movement of the rod 10 will of course cause the roller 13 to move toward the operator and away from the stationary roller 38 thereby spreading the walls of the tire casing at this point. When the tire casing has been spread the desired amount the operator slides the handle section 17a downwardly to engage the lugs 21 with the rack bar 20 and thereby secure the rod 10 at the desired adjustment for maintaining the tire casing in spread condition. With the tire casing mounted on the device and in spread condition, said casing may be revolved so that any point on the circumference of the casing may be brought into engagement with the rollers 13 and 38 for spreading the casing at the desired point.

In order to permit the operator to better examine and repair the tire casing while the same is mounted on the device there is provided a suitable electric lamp 39, and the same is secured through the medium of a bracket 40 to the perpendicular member 33. The cord for the lamp 39 is designated by the reference numeral 41 and of course will be provided at its free end with a plug or the like for engagement with a suitable electric outlet.

Having thus described my invention, what I claim as new is:

1. In a tire spreader, a vertical post, a tubular member extending laterally from the post at the base thereof, a rod slidably mounted in said tubular member, means for securing said rod at the desired adjustment, a vertically movable member, vertically spaced pairs of links pivotally connecting said vertically movable member with said post, means connected with the upper pair of links, and the upper portion of said post for securing said links against casual downward movement but permitting said links to move downwardly upon application of pressure thereto, a tire casing supporting roller on said vertically movable member, a roller on the end of said tubular member remote from said post, laterally spaced rollers on the outer end of said rod and cooperable with the roller on said tubular member for spreading a tire casing engaged thereby upon movement of the rod outwardly with respect to said tubular member; the roller on said vertical member being adapted to support a tire casing for engagement with the roller on said tubular member and the rollers on said rod.

2. In a tire spreader, a horizontal tubular member, a rod slidably mounted in said tubular member, means mounted above said tubular member for suspending a tire casing in substantially a vertical plane, a roller on said tubular member to engage the inner face of one side wall of the tire casing, laterally spaced rollers on said rod to engage the inner face of the outside wall of said tire casing, means for sliding said rod relative to said tubular member for spreading the portion of the casing engaged by said rollers and for securing said rod at the desired adjustment to retain the tire casing in spread condition, said means including a handle secured to the rod and operating in a slot in said tubular member, a rack bar on said tubular member paralleling said slot, and said handle including a lug equipped slidable member, the lug thereof engageable with the rack bar to secure the rod at the desired adjustment.

3. In a tire spreader, a base, means mounted on the base and having tire wall engaging members slidably supported for movement towards and away from one another for spreading the walls of a tire casing, a post rising from said base, links pivotally connected at one end to the post at vertically spaced points on the post, tire supporting and suspension means supported by the links at the free ends thereof, and pivotally connected with said links, and interengaging means connected with said post and said links for holding the tire supporting and suspension means at the desired elevation.

4. In a tire spreader, a base, means mounted on the base and having tire wall engaging members slidably supported for movement towards and away from one another for spreading the walls of a tire casing, a post rising from said base, links pivotally connected at one end to the post at vertically spaced points on the post, tire supporting and suspension means supported by the links at the free ends thereof, and pivotally connected with said links, and interengaging means connected with said post and said links for holding the tire supporting and suspension means at the desired elevation, said interengaging means including a lateral pin mounted on said post, and a member pivoted at one end to the uppermost of said links and having a free end provided with a series of notches for engagement with said pin.

5. In a tire spreader, a base, means mounted on the base including tire wall engaging elements slidably mounted for movement relative to one another for spreading the walls of a tire, a post rising from said base, tire supporting and suspension means connected with said post and including vertically spaced links pivotally connected at one end with said post, a lateral pin supported adjacent the upper end of said post, a rod pivoted at one end to the uppermost of said links, a tubular member in which said rod is slidably engaged, internal spring means engaged with said rod and said tubular member for normally urging said rod inwardly of the tubular member, and said tubular member having a free end provided with a series of notches engageable with said pin in a manner to secure the tire supporting and suspension means at the desired vertical adjustment.

HERBERT A. SORUM.